(12) United States Patent
Plha et al.

(10) Patent No.: US 9,884,387 B2
(45) Date of Patent: Feb. 6, 2018

(54) METHOD AND APPARATUS FOR THE INDUCTIVE HIGH-FREQUENCY WELDING OF METAL PRODUCTS HAVING DIFFERENT MATERIAL THICKNESSES AND/OR MATERIAL GRADES USING AT LEAST TWO COMPONENT INDUCTION CONDUCTORS WHICH ARE SEPARABLE FROM ONE ANOTHER

(75) Inventors: Jens Plha, Düsseldorf (DE); Martin Koch, Neukirchen-Vluyn (DE); Stefan Wischmann, Berlin (DE); Bernhard Nacke, Burgdorf (DE); Alexander Nikanorov, Hannover (DE); Holger Schülbe, Meißner (DE); Mario Schmidt, Moers (DE); Henning von Löhneysen, Kassel (DE)

(73) Assignee: WISCO Tailored Blanks GmbH, Duisburg (DE)

( * ) Notice: Subject to any disclaimer, the term of this patent is extended or adjusted under 35 U.S.C. 154(b) by 2054 days.

(21) Appl. No.: 12/162,565

(22) PCT Filed: Jan. 22, 2007

(86) PCT No.: PCT/EP2007/050615
§ 371 (c)(1),
(2), (4) Date: Mar. 9, 2009

(87) PCT Pub. No.: WO2007/110253
PCT Pub. Date: Oct. 4, 2007

(65) Prior Publication Data
US 2010/0320192 A1 Dec. 23, 2010

(30) Foreign Application Priority Data

Jan. 31, 2006 (DE) .................. 10 2006 004 694

(51) Int. Cl.
*B23K 13/01* (2006.01)
*B23K 13/02* (2006.01)
*B23K 101/18* (2006.01)

(52) U.S. Cl.
CPC ............ *B23K 13/015* (2013.01); *B23K 13/02* (2013.01); *B23K 2201/185* (2013.01)

(58) Field of Classification Search
USPC ..... 219/100–107, 67, 56, 58, 59, 83, 86, 64, 219/78, 607, 611, 615–618, 633–635,
(Continued)

(56) References Cited

U.S. PATENT DOCUMENTS 2,938,993 A * 5/1960 Rudd .............................. 219/67
3,701,871 A * 10/1972 Schafer ........................ 219/614
(Continued)

FOREIGN PATENT DOCUMENTS

| CA | 1 133 072 | 10/1982 |
| CA | 1 153 073 | 8/1983 |
| DE | 975798 | 10/1962 |
| DE | 1191057 | 4/1965 |
| DE | 011 915 A | 9/1971 |

(Continued)

OTHER PUBLICATIONS
International Search Report for PCT/EP2007/050500.

*Primary Examiner* — Thien S Tran
(74) *Attorney, Agent, or Firm* — Reinhart Boerner Van Deuren P.C.

(57) ABSTRACT

A method and a device for inductive radiofrequency welding of metal products, include heating by inducing radiofrequency currents with use of at least one induction conductor. The metal products and a welding zone are moved relative to one another, so that edge regions of the metal products to be welded are brought in contact in the welding zone and are welded together to form a weld seam. Metal products with different material thicknesses and/or material properties can be welded together because an induction conductor which heats the edge regions of the metal products is used which (Continued)

includes at least two mutually separable induction conductor components that are assigned to the respective metal product and are adapted thereto, and the edge regions to be welded are heated in a manner that is adjusted separately for the respective metal product.

17 Claims, 3 Drawing Sheets

(58) Field of Classification Search
USPC .............. 219/643, 670, 672–676; 228/51; 156/272.2, 380.2, 379.6; 72/60, 62, 709, 72/342.94; 29/421.1; 148/520, 570
See application file for complete search history.

(56) References Cited

U.S. PATENT DOCUMENTS

| | | | |
|---|---|---|---|
| 4,197,441 A | 4/1980 | Rudd | 219/9.5 |
| 4,506,126 A | 3/1985 | Smets et al. | 219/10.53 |
| 4,554,029 A * | 11/1985 | Schoen et al. | 148/112 |
| 4,694,134 A * | 9/1987 | Ross | 219/613 |
| 4,751,360 A | 6/1988 | Ross | 219/10.61 |
| 5,323,951 A | 6/1994 | Takechi et al. | 228/102 |
| 6,037,556 A | 3/2000 | Rudd | 219/61.4 |
| 6,184,508 B1 * | 2/2001 | Isoyama et al. | 219/603 |

FOREIGN PATENT DOCUMENTS

EP    495 989 A1    7/1992

* cited by examiner

METHOD AND APPARATUS FOR THE INDUCTIVE HIGH-FREQUENCY WELDING OF METAL PRODUCTS HAVING DIFFERENT MATERIAL THICKNESSES AND/OR MATERIAL GRADES USING AT LEAST TWO COMPONENT INDUCTION CONDUCTORS WHICH ARE SEPARABLE FROM ONE ANOTHER

CROSS-REFERENCE TO RELATED APPLICATIONS

This application is a National Phase Application of International Patent Application No. PCT/EP2007/050615, filed on Jan. 22, 2007, which claims the benefit of and priority to German Patent Application No. DE 10 2006 004 694.3-34, filed Jan. 31, 2006, which is owned by the assignee of the instant application. The disclosure of each of these applications is incorporated herein by reference in its entirety.

FIELD OF THE INVENTION

The invention relates to a method for the inductive radiofrequency welding of at least two metal products, in which the edge regions to be welded of the at least two metal products are heated by inducing radiofrequency currents with the use of at least one induction conductor, the metal products and a welding zone are moved relative to one another, the edge regions to be welded are brought in contact in the welding zone and are welded together to form a weld seam. The invention furthermore relates to a device for the inductive radiofrequency welding of at least two metal products, having means for carrying out a relative movement between the metal products and a welding zone, as well as at least one induction conductor which heats the edge regions to be welded of the at least two metal products by inducing radiofrequency currents.

BACKGROUND OF THE INVENTION

Welding of metal products by using inductive radiofrequency currents is already known from the prior art. The radiofrequency welding is carried out contactlessly, and in particular makes it possible to produce mass products in continuous throughput methods. In inductive radiofrequency welding, an induction conductor carrying radiofrequency currents induces oppositely directed radiofrequency currents in the metal product to be welded, and these lead to strong heating of the metal product at the corresponding positions carrying radiofrequency current. In general, closed current loops are always induced, with essentially two effects playing a role. These are on the one hand the "proximity effect" which means that the induced current densities are greatest in the immediate vicinity of the induction conductors. Furthermore, owing to the "skin effect", the current transport of the induced radiofrequency currents takes place not inside the metal product, as for instance with a direct current, but essentially (i.e. substantially) on its surface. The induced radiofrequency currents travel in closed paths, which can be influenced by the arrangement of the induction conductors. In general, as a rule, the induction conductor is arranged so that the return current paths are concentrated on edge regions of the metal products owing to the "skin effect". Then the edge regions through which current flows are correspondingly strongly heated. The edge regions heated in this way are brought in contact with one another and welded together to form a weld seam.

A corresponding method is known from US patent specification U.S. Pat. No. 4,197,441. In the known method, an induction conductor which is adapted to the weld seam to be produced, is used to correspondingly heat the marginal regions of the metal products to be welded. A problem with the known method is that the heating of the marginal regions takes place very differently for metal products with different wall thicknesses or consisting of materials having different electrical resistances, so that stable process management cannot be ensured when corresponding metal products are being welded. However, the welding of metal products with different wall thicknesses or consisting of materials having different electrical resistances is necessary for the production of semi-finished products, for example tailored products. Tailored products generally have different wall thicknesses and/or material properties or substances, which are adapted to loading. Differently thick metal products or metal products consisting of different materials are often welded together in order to produce corresponding tailored products. Such metal products may for example be flat metal products, known as "tailored blanks", cut sheet metal shaped to form hollow sections or tubes, known as "tailored tubes", or cut sheet metal shaped in strips, known as "tailored strips". A large application field of tailored products is automotive manufacturing, since tailored products have an optimal ratio between maximum loading and weight, and in this regard can be adapted very well to the respective application task.

SUMMARY OF THE INVENTION

In one aspect, the present invention is related to an inductive radiofrequency welding method and a corresponding inductive radiofrequency welding device, with which metal products with different material thicknesses and/or material properties or substances can be welded together reliably in processing terms.

In an embodiment, a method for inductive radiofrequency welding of metal products includes using an induction conductor which includes at least two mutually separable induction conductor components that are assigned to the respective metal product and are adapted thereto, and heating of edge regions to be welded is adjusted separately for the respective metal product.

In another embodiment in accordance with the invention, it is possible for metal products with different wall thicknesses and/or material properties with different electrical resistances to be welded together reliably in processing terms since, owing to the adaptation of the respective induction conductor component, the edge regions can be heated in a manner that is adjusted individually to the respective metal product, or the induced radiofrequency current and its trajectory in the metal product can be influenced so that the metal products can be heated to the desired welding temperature reliably in processing terms. The previously existing problem, that for example metal products with a smaller wall thickness were heated more strongly than metal products with a greater wall thickness, is resolved by embodiments in accordance with the invention. The same applies when the metal products have different electrical resistances in relation to the induced radiofrequency currents. High welding temperatures of the edge regions of the metal product may also be adjusted by the separate adjustment of the heating, for example in so far as desired for different materials of the metal products.

If the metal products are brought together abutting or overlapping in the welding zone so as to maintain a V-shaped gap extending in the welding direction, then in another embodiment in accordance with the invention continuous heating of the edge region can in a targeted manner be generated in the region of the V-shaped gap of the metal products, in order to heat the metal products to the desired welding temperature in the welding zone and weld them together continuously.

In another embodiment in accordance with the invention, the induction conductor components are displaced relative to one another so that differently long edge regions to be welded of the respective metal products are heated before the welding in the welding zone. A smaller thickness of one of the metal products can therefore be taken into account, for example by a shorter length of the heated edge region. As a result, the metal products are heated to the same temperatures in the region of the welding zone, since a metal product with smaller thickness heats up more rapidly. Without wishing to be bound by theory, it is believed that the temperature of the metal product depends on the length of the respectively heated edge region. Different material properties and therefore differently large electrical resistances of the individual metal products may also be accounted for by mutual displacement of the induction conductor components.

The ratio of the lengths of the heated edge regions of the respective metal products during welding can be adjusted proportionally to the ratio of the electrical resistances of the materials and/or thicknesses of the metal products, or correspondingly thereto, to produce a weld seam and achieve welding of metal products. By this measure, the different heating characteristics of different metal products to be welded together can be compensated for.

Tailored products can therefore be produced reliably in processing terms with embodiments in accordance with the invention. Tailored products are often used for automotive manufacturing, for example for the construction of bodywork, and they generally include materials with different wall thicknesses and material properties. They allow on the one hand a loading-compliant configuration of corresponding structural parts of a motor vehicle, and on the other hand a weight which is as low as possible.

The induction conductor components can have different lengths parallel to the welding direction, so that differently long edge regions of the different metal products can be heated in a way by which different material thicknesses or material properties of the respective metal products can be accounted for.

In another embodiment in accordance with the invention, the induction conductor components are connected in series or parallel. With parallel connection of the induction conductor components, the flow of current in the individual induction conductor components may take place in the same rotational sense. Series connection of the induction conductor components is a simpler way of interconnecting the induction conductor components, and therefore provides an economical benefit. Parallel connection of the induction conductor components, on the other hand, makes it possible to induce different radiofrequency currents in each metal product and to carry out individual heating without modifying the geometrical position of the induction conductor components.

Each induction conductor component may respectively be connected to a radiofrequency current source, so that there is flexibility in respect of the energy input into the respective metal products, for example by selecting a different frequency of the radiofrequency current.

Another embodiment in accordance with the invention may include two induction conductor components, for example two mirror-symmetrically arranged U-shaped induction conductor components, having induction conductor component regions essentially extending transversely to the welding direction, with the induction conductor component regions arranged before the welding zone in the welding direction preferably projecting beyond the edge region to be welded of the respective metal product, or optionally with induction conductor component regions arranged behind the welding zone in the welding direction and essentially extending transversely to the welding direction, extending outwards from the middle of the weld seam. The projection beyond the edge regions still to be welded of the respective metal products, before the welding zone in the welding direction, ensures the induction of a radiofrequency current in the metal product which flows from the intersection point of one induction conductor component with the edge region still to be welded, for example of a first metal product, through the welding zone via a second edge region to be welded to the intersection point of the other induction conductor component with the edge region of a second metal product. Initially, a radiofrequency current is induced owing to the proximity effect and skin effect as far as the edge region of the metal product to be welded. The subsequent flow of current in the edge region of the metal product takes place almost exclusively on the surface owing to the skin effect, so that correspondingly high current densities lead to targeted heating of the edge regions to be welded. The U-shaped induction conductor components in this case represent a geometry of the induction conductor components for producing the said flow of current.

In another embodiment in accordance with the present invention, an inductive radiofrequency welding device includes an induction conductor which comprises at least two mutually separable induction conductor components that are assigned to the respective metal product and are adapted thereto, and edge regions to be welded of the respective metal products is are heated in a manner that is adjustable separately from one another.

In another embodiment in accordance with the invention, the flow of current induced in the metal products may take place as a function of the material thickness and/or material property, so that it is possible to ensure that differently thick metal products or metal products consisting of different materials or metal products with different electrical resistances can be welded together reliably in processing terms.

Another embodiment in accordance with the invention can weld different metal products by providing induction conductor components arranged displaceably at least in the welding direction. By displacing the induction conductor components respectively assigned to the metal products, the edge regions can be heated in a manner that is adjusted as a function of the material thickness and/or material property. The welding zone is not influenced by the displacement, since it is rigidly defined by the contact region of the two metal products.

Reliable welding of metal products with different thicknesses and/or material properties is achieved in another embodiment in accordance with the invention by arranging the induction conductor components so that the ratio of the lengths of the heated edge regions of the respective metal products is proportional to the ratio of the electrical resistances of the materials and/or thicknesses of the metal products, or corresponds thereto. A corresponding arrangement is preferably carried out before the start of the welding method. It is also possible to adapt the arrangement of the induction conductor components during the welding method.

If the induction conductor components are connected in series and joined together by connecting means, for example cables or screw fittings, then only a single radiofrequency current source is required in order to supply the induction conductor components.

If the induction conductor components are connected in parallel, or if a radiofrequency current source is provided for each induction conductor component, then different radiofrequency currents accounting for the material thickness and/or the material property can be induced in the different metal products. With parallel connection of the induction conductor components, generally only one radiofrequency source is used.

Another embodiment in accordance with the invention, which for example takes into account a smaller material thickness of a metal product, includes using the induction conductor components that have different lengths in the welding direction.

If two induction conductor components, for example two mirror-symmetrically arranged U-shaped induction conductor components, having induction conductor component regions essentially extending transversely to the welding direction are provided, with induction conductor component regions arranged before the welding zone in the welding direction preferably projecting beyond the edge region to be welded of the respective metal product, or optionally with induction conductor component regions arranged behind the welding zone in the welding direction and essentially extending transversely to the welding direction, extending outwards from the middle of the weld seam, then the induced radiofrequency current can be guided in a targeted manner along the edge region to be welded, while it alternates from the first to the second metal product in the welding zone. Owing to the induction conductor component regions arranged in the region behind the welding zone in the welding direction, controlled return flow of the induced radiofrequency currents into the edge regions of the metal products can take place so that a closed flow of current is created and the process control for the welding is improved overall.

In another embodiment in accordance with the invention the metal products may be welded by providing induction conductors, assigned to the metal product, above and below the metal products to be welded. This may for example be necessary if the metal products have very large thicknesses.

In the event of very large thicknesses of the metal products to be welded, another embodiment in accordance with the invention may also be applied or arranged repeatedly in succession in the welding direction. For example, heating of the edge region to be welded of the metal product may be carried out in a first step, and further down in the welding direction the heated metal product may be heated to welding temperature in a second step.

BRIEF DESCRIPTION OF THE DRAWINGS

There is a multiplicity of possibilities for designing or refining embodiments in accordance with the invention for inductive radiofrequency welding of metal products. The following is a description of an exemplary embodiment in connection with the drawing. In the drawing.

DESCRIPTION

Figure 1:
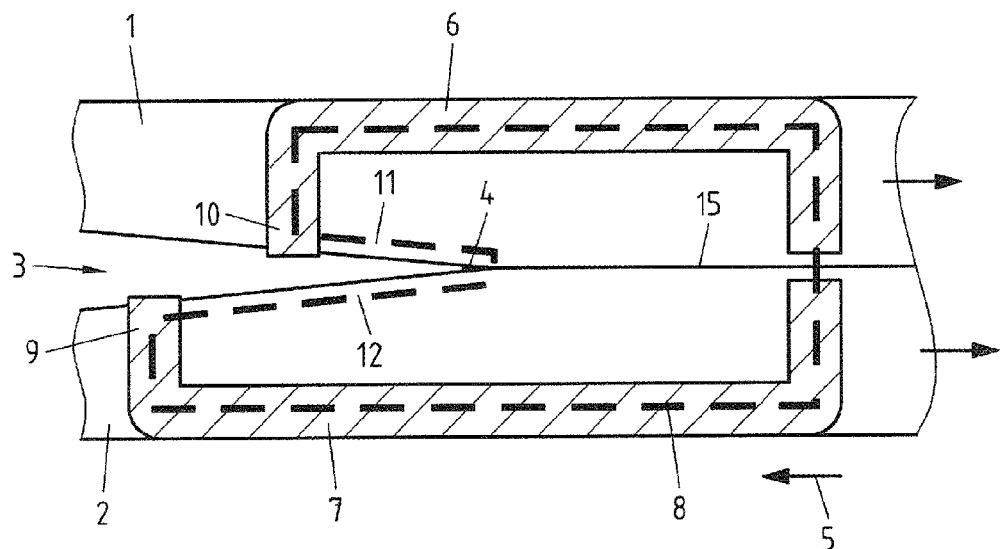
FIG. 1 shows a schematic plan view of a first exemplary embodiment in accordance with the invention when welding different metal products.

The schematic plan view of FIG. 1 shows an exemplary embodiment in accordance with the invention for the inductive radiofrequency welding of two metal products 1, 2, in which the edge regions 11, 12 to be welded are heated in a manner that is adjusted independently of one another by two mutually separable induction conductor components 6, 7. Preferably, the metal products 1, 2 are brought together and welded while forming a V-shaped gap 3 in the region of a welding zone 4. To this end means (not shown in FIG. 1) are required for carrying out a relative movement of the metal products relative to a welding zone, as well as guide means (not shown in FIG. 1) for bringing the metal products together in the region of the welding zone.

The metal products 1, 2 are moved oppositely to the welding direction 5 by the aforementioned means. Now two induction conductor components 6, 7 which are connected to a radiofrequency current source (not shown in FIG. 1) are arranged above the metal products 1, 2. The induction conductor components 6, 7 may be connected to each other via cables or screw fittings. It is however also possible for the two induction conductor components 6, 7 to be connected in parallel so that the radiofrequency current through the individual induction conductor components 6, 7 is adjustable independently. Preferably, they are then respectively connected to a radiofrequency current source (not shown in FIG. 1) so that not only the radiofrequency current, but also its frequency can be adjusted as a function of the geometry and the material of the respectively assigned metal product.

When the induction conductor components 6, 7 are supplied with a radiofrequency current, immediately below the induction conductor components 6, 7 a radiofrequency induction current 8 is induced owing to the proximity effect, which travels in the metal product in the opposite direction to the radiofrequency current fed into the induction conductor components 6, 7. Depending on the current frequency and the material, the current densities initially concentrate in the region of the surface of the metal products 1, 2 immediately below the induction conductors 6, 7. Here, the proximity effect and the skin effect act simultaneously.

The induction conductor components 6, 7 comprise induction conductor component regions 9, 10, which are arranged approximately substantially perpendicularly to the welding direction. Since all the induced radiofrequency currents have closed current paths, owing to the arrangement of the induction conductor component regions 9, 10 of the U-shaped induction conductor components 6, 7, a radiofrequency current is induced along the edge regions 11, 12 to be welded of the metal products 1, 2. This flow of current, which is essentially determined by the skin effect, travels on the surface of the edge regions 11, 12 of the metal products 1, 2 and causes heating of the edge regions 11, 12, which is at least partly proportional to the length of the current-carrying edge region 11, 12 of the respective metal product 1, 2.

In the present first exemplary embodiment, the length of the heated edge region 11 of the metal product 1 is shorter overall than that of the metal product 2, so that it is possible to account for the fact that the metal product 1 has for example a smaller material thickness or a higher electrical resistance than the metal product 2, so that it is heated more rapidly. As may be seen from FIG. 1, a relative movement 5 takes place between the induction conductor components 6, 7 and the associated metal products 1, 2, the metal products 1, 2 simultaneously being brought in contact in the welding zone 4. This makes it possible, in a continuous manner, to generate a continuous weld seam in which the corresponding edge regions 11, 12 are heated continuously by an induced radiofrequency current and are bonded together by a material connection in the welding zone 4.

As may be seen from the described exemplary embodiment in accordance with the invention, not only can differently thick metal products therefore be welded but also metal products comprising different materials, i.e. metal products having different melting temperatures, can be welded together. To this end, the ratio of the lengths of the edge regions 11, 12 to be heated needs to be adjusted to one another accordingly. Although the metal products are brought together abutting and welded together in the exemplary embodiment shown in FIG. 1, overlapping welding of the two metal products 1, 2 may also be achieved in a similar manner.

Figure 2:
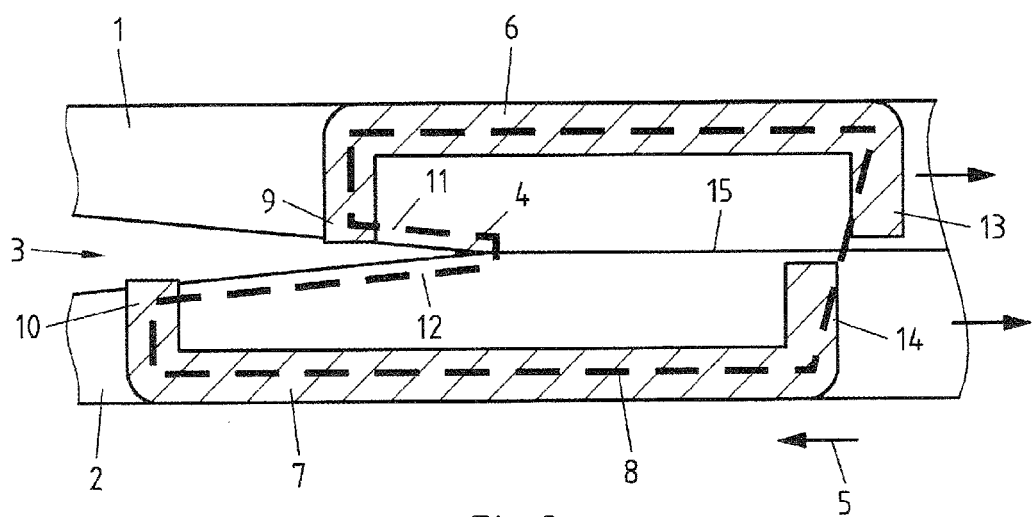
FIG. 2 shows, in a schematic plan view, the exemplary embodiment of FIG. 1 adapted to the welding of two further metal products.

FIG. 2 now shows another embodiment in accordance with the invention which can be adapted to a metal product 1 with an even smaller thickness or an even higher electrical resistance than exemplified in FIG. 1. The mutually separable induction conductor components 6, 7 are mutually displaced further in order to account for the smaller material thickness of the metal product 1, so that the length of the current-carrying edge region 11 of the metal product 1 is even shorter. The lower dissipation of heat when using a flatter metal product during the welding of the metal products 1, 2 can therefore be accounted for. It is not required that the induction conductor component regions 13, 14, arranged perpendicularly to the welding direction and behind the welding zone in the welding direction, of the induction conductor components 6, 7 are arranged precisely opposite to each other since the induced radiofrequency current flows for example from the metal product 1 into the metal product 2 while crossing obliquely over the weld seam, without correspondingly heating an edge. Even with this inexactly opposing position of the individual induction conductor component regions 13, 14, controlled return flow of the induced radiofrequency currents is achieved in order to improve the process control.

Figure 3A:
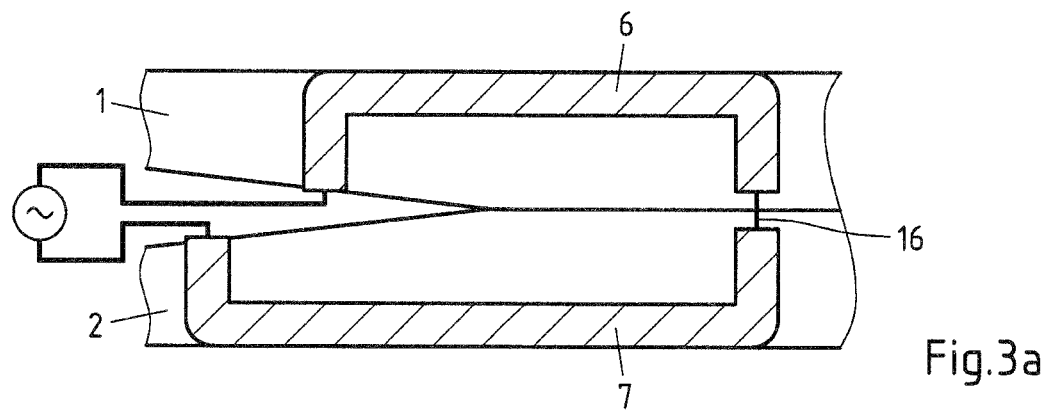
FIG. 3a shows a second exemplary embodiment, wherein the separable induction conductor components are connected in series.
Figure 3B:
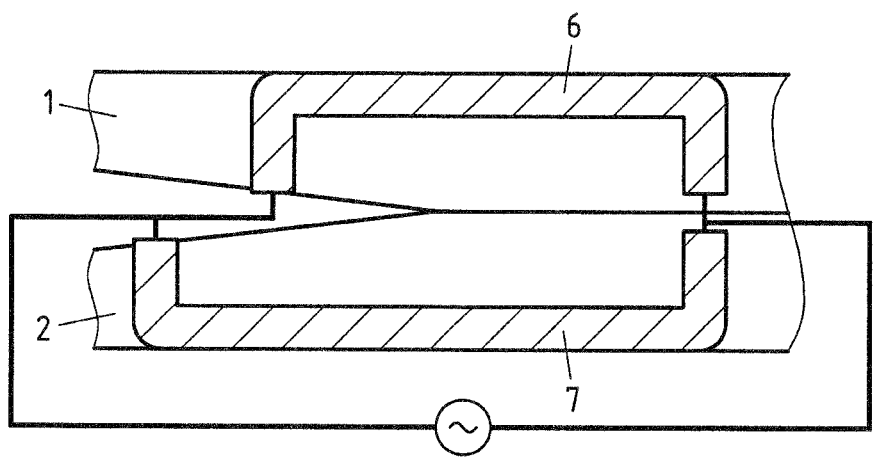
FIG. 3b shows a third exemplary embodiment, wherein the separable induction conductor components are connected parallel.
Figure 3C:
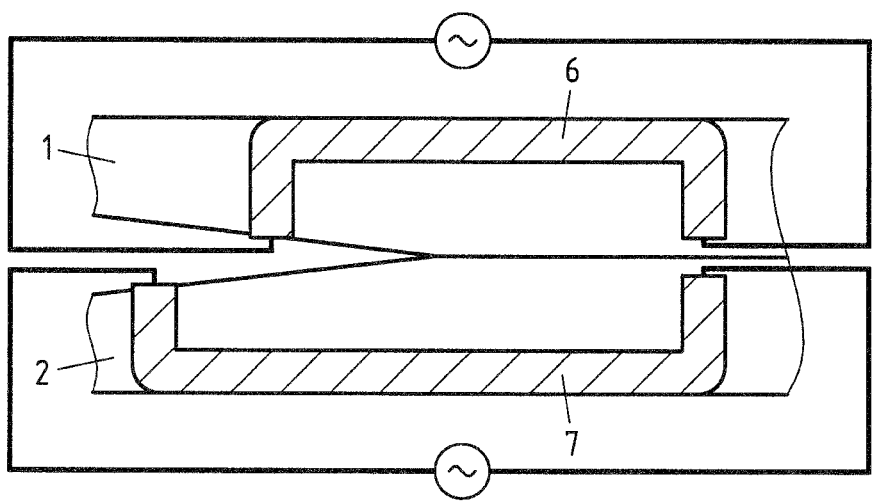
FIG. 3c shows a forth exemplary embodiment, wherein each induction conductor component is respectively connected to a current source.

FIG. 3a shows a second exemplary embodiment, wherein the separable induction conductor components 6, 7 are connected in series. The two mutually separable induction conductor components are joined together by connecting means 16. FIG. 3b shows a third exemplary embodiment, wherein the separable induction conductor components 6, 7 are connected parallel. FIG. 3c shows a forth exemplary embodiment, wherein each induction conductor component 6, 7 is respectively connected to a current source.

Figure 4:
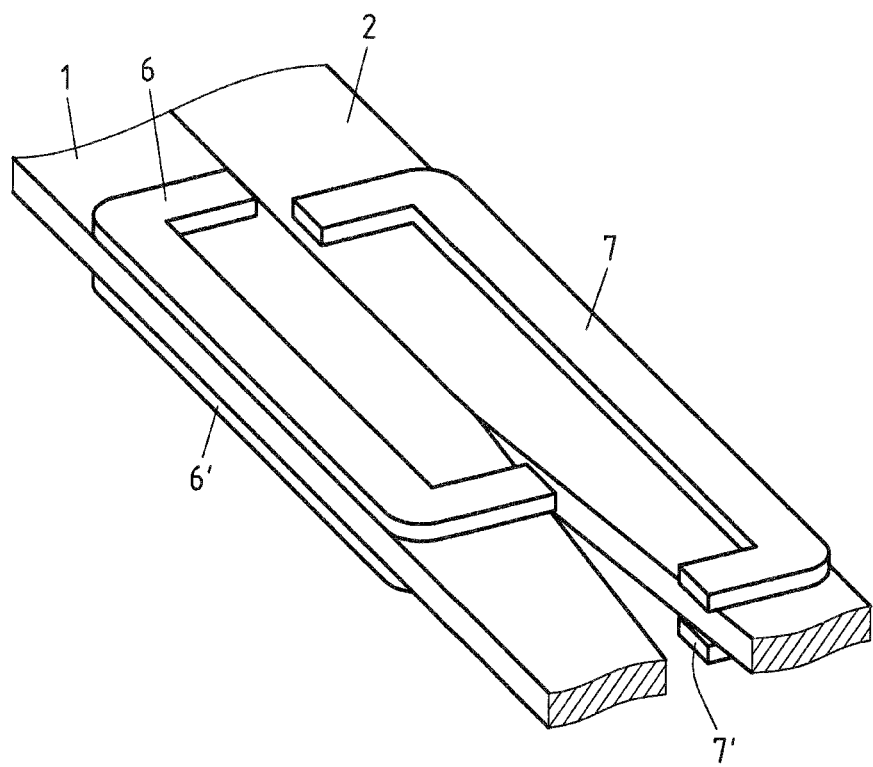
FIG. 4 shows a fifth exemplary embodiment, wherein at least two mutually separable induction conductor components are provided above and below the metal products to be welded.

FIG. 4 shows a fifth exemplary embodiment, wherein at least two mutually separable induction conductor components 6, 6', 7, 7' are provided above and below the metal products to be welded.

Although only the welding of a flat metal product is disclosed in the present exemplary embodiment, hollow sections or other metal products, for example tailored products, having different material thicknesses and properties may also be welded utilizing embodiments in accordance with the invention.

The invention claimed is:

1. Method for inductive radiofrequency welding of metal products, in which edge regions to be welded of the metal products are heated by inducing radiofrequency currents with use of at least one induction conductor, the metal products and a welding zone are moved relative to one another, the edge regions to be welded are brought in contact in the welding zone and are welded together to form a weld seam, wherein an induction conductor is used which comprises at least two mutually separable induction conductor components that are assigned to a respective metal product and are arranged relative thereto, and the edge regions to be welded are heated up, by induced radiofrequency current and a trajectory of the induced radiofrequency current in the metal product, to a welding temperature by each mutually separable induction conductor component in a manner that is adjusted separately for the respective metal product.

2. Method according to claim 1, wherein the metal products are brought together abutting or overlapping in the welding zone maintaining a V-shaped gap extending in a welding direction.

3. Method according to claim 1, wherein the at least two mutually separable induction conductor components are displaced relative to one another so that different long edge regions of the respective metal products are heated before the welding in the welding zone.

4. Method according to claim 1, wherein a ratio of lengths of heated edge regions of the respective metal products during the welding is adjusted proportionally to a ratio of electrical resistances of materials or thicknesses of the metal products, or correspondingly thereto.

5. Method according to claim 1, wherein tailored products are produced.

6. Method according to claim 1, wherein the at least two mutually separable induction conductor components have different lengths parallel to the welding direction.

7. Method according to claim 1, wherein the at least two mutually separable induction conductor components are connected in series or parallel.

8. Method according to claim 1, wherein each induction conductor component is respectively connected to a radiofrequency current source.

9. Method according to claim 1, wherein at least two mutually separable induction conductor components, having induction conductor component regions extending transversely to the welding direction are used, with the induction conductor component regions arranged before the welding zone in the welding direction projecting at least partially beyond the edge region to be welded of the respective metal product, or optionally with induction conductor component regions arranged behind the welding zone in the welding direction and extending transversely to the welding direction, extending outwards from about a middle of the weld seam.

10. Device for inductive radiofrequency welding of metal products, having means for carrying out a relative movement between the metal products and a welding zone, as well as at least one induction conductor which heats edge regions to be welded of the metal products by inducing radiofrequency currents, wherein the induction conductor comprises at least two separable induction conductor components that are assigned to the respective metal product and are arranged relative thereto, so that the edge regions to be welded of the respective metal products are heated up, by induced radiofrequency current and a trajectory of the induced radiofrequency current in the metal product, to a welding temperature by each mutually separable induction conductor component in a manner that is adjustable separately from one another.

11. Device according to claim 10, wherein at least two mutually separable induction conductor components arranged displaceably at least in a welding direction are provided.

12. Device according to claim 10, wherein the at least two mutually separable induction conductor components are arranged so that a ratio of lengths of heated edge regions of the respective metal products is proportional to a ratio of electrical resistances of the materials or thicknesses of the metal products, or corresponds thereto.

13. Device according to claim 10, wherein the at least two mutually separable induction conductor components are connected in series and joined together by connecting means.

14. Device according to claim 10, wherein the at least two mutually separable induction conductor components are connected in parallel, or a radiofrequency current source is provided for each induction conductor component.

15. Device according to claim 10, wherein the at least two mutually separable induction conductor components have different lengths in a welding direction.

16. Device according to claim 10, wherein at least two mutually separable induction conductor components, with induction conductor component regions extending transversely to the welding direction being provided, with the induction conductor component regions arranged before the welding zone in the welding direction projecting beyond the edge region to be welded of the respective metal product, or optionally with induction conductor component regions arranged behind the welding zone in the welding direction and in each case extending transversely to the welding direction, extending outwards approximately from about a middle of the weld seam.

17. Device according to claim 10, wherein at least two mutually separable induction conductor components assigned to the metal product are provided above and below the metal products to be welded.

* * * * *